United States Patent [19]
Suzuki et al.

[11] Patent Number: 6,161,156
[45] Date of Patent: Dec. 12, 2000

[54] ELECTRONIC EQUIPMENT WITH EXPANSION SLOT

[75] Inventors: Sadaka Suzuki, Kanagawa; Kyoji Kawamura; Shinichi Matsushita, both of Tokyo, all of Japan

[73] Assignee: Sony Corporation, Tokyo, Japan

[21] Appl. No.: 09/049,807

[22] Filed: Mar. 27, 1998

[51] Int. Cl.[7] .................................................. G06F 13/00
[52] U.S. Cl. .......................... 710/101; 710/100; 710/102; 710/131; 348/836
[58] Field of Search ..................................... 710/100, 101, 710/129, 131, 102, 103; 348/836; 345/30; 307/38, 115

[56] References Cited

U.S. PATENT DOCUMENTS

| | | | |
|---|---|---|---|
| 5,121,118 | 6/1992 | Hermann | 341/118 |
| 5,150,400 | 9/1992 | Ukegawa | 379/100.17 |
| 5,396,485 | 3/1995 | Ohno et al. | 370/16 |
| 5,561,772 | 10/1996 | Donier et al. | 710/101 |
| 5,659,763 | 8/1997 | Ohashi | 713/320 |
| 5,764,968 | 6/1998 | Ninomiya | 713/601 |

*Primary Examiner*—Ario Etienne
*Attorney, Agent, or Firm*—Frommer Lawrence & Haug, LLP.; William S. Frommer; Joe H. Shallenburger

[57] ABSTRACT

The present invention provides electronic equipment which requires no space for installation, the degree of freedom in relation to the extension of a function of which is large and which enables the reduction of the cost. The present invention saves space in the extension of a function by providing an expanding slot for installing expanded equipment to the body of a video display terminal. In a state in which a scan converter is connected to the body of the video display terminal, a serial bus 30c which is an internal bus of the video display terminal and a serial bus 50 which is an internal bus of the scan converter are connected and the internal bus of the video display terminal seems to be extended to an external device. Serial buses 30a, 30b and 30c which are the internal bus of the video display terminal can be switched in a bus switch. After the scan converter is connected to the video display terminal, the scan converter controller of the scan converter controls a user interface in place of the main control unit of the video display terminal.

7 Claims, 6 Drawing Sheets

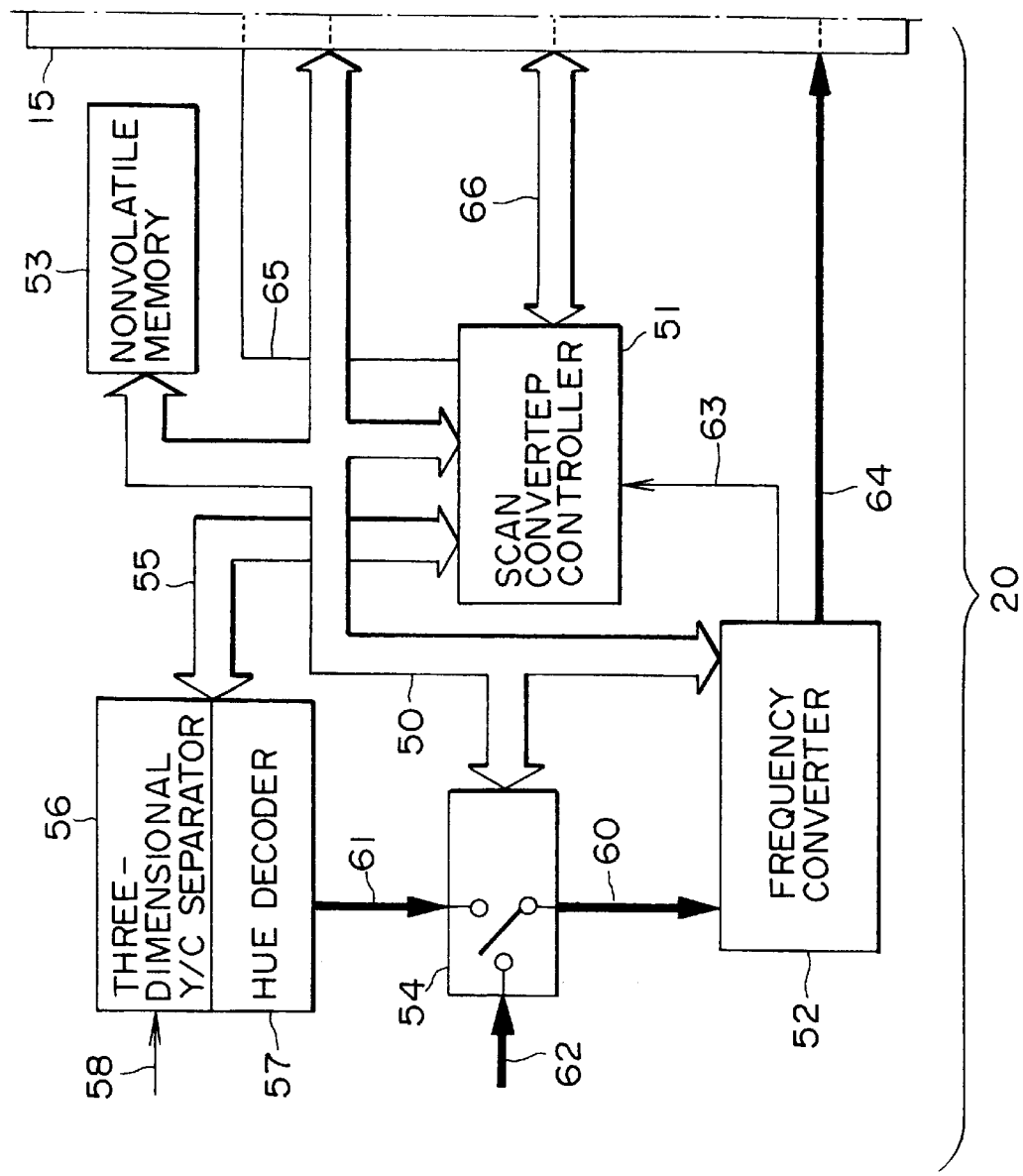

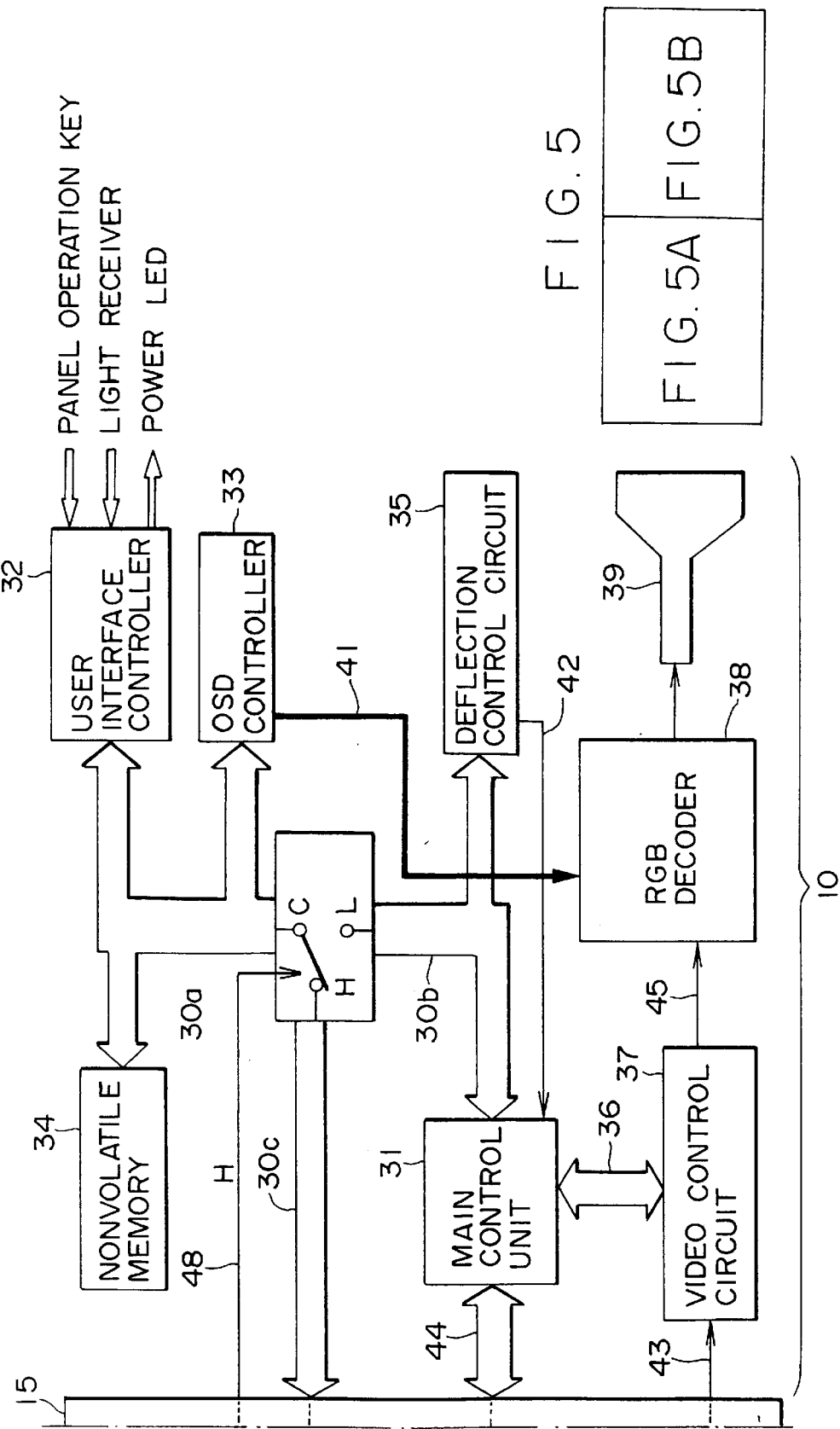

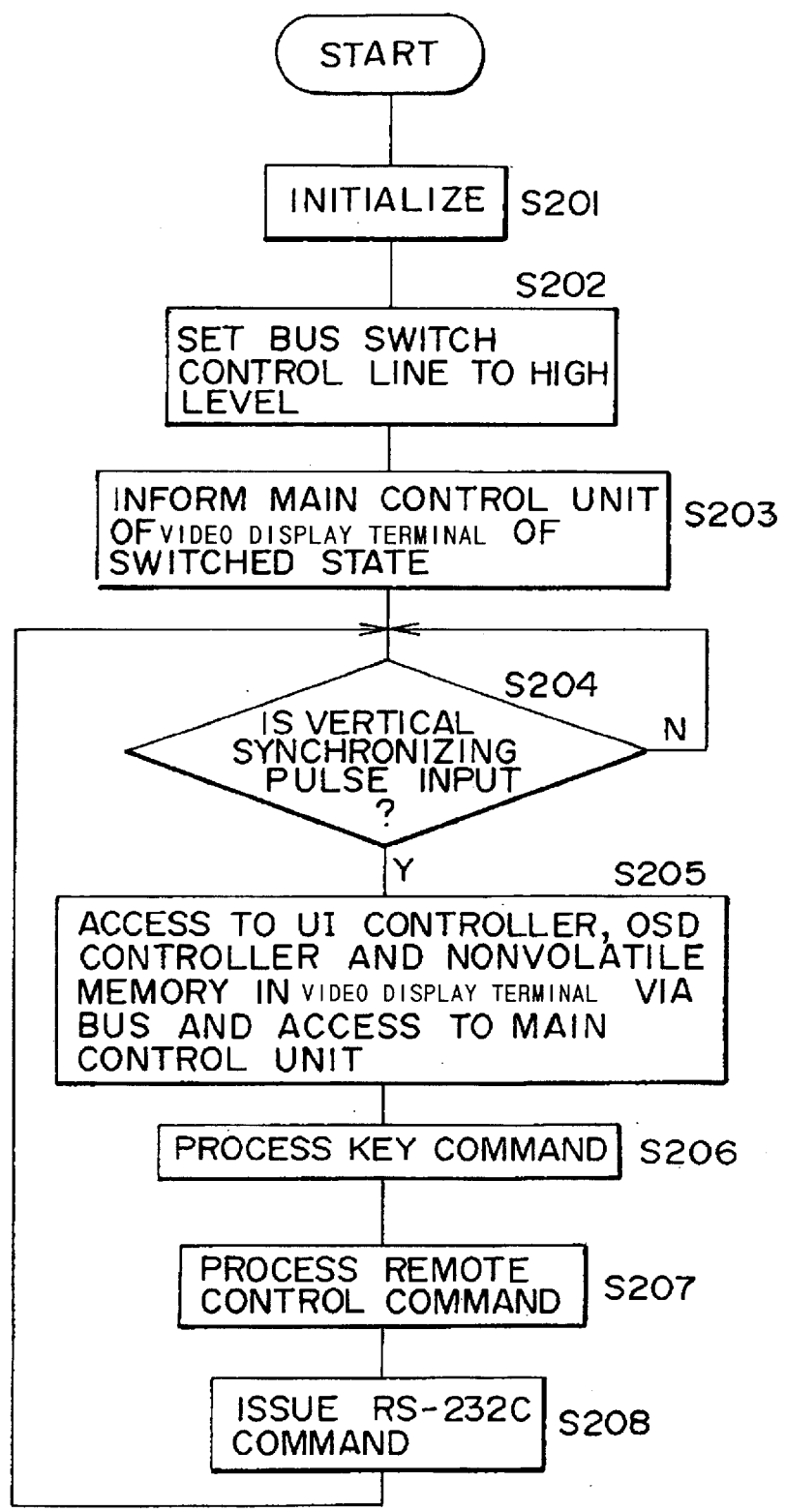

ELECTRONIC EQUIPMENT WITH EXPANSION SLOT

BACKGROUND OF THE INVENTION

1. Field of the Invention

The present invention relates to electronic equipment such as a video display terminal. Particularly, the present invention relates to electronic equipment constituted including plural control devices mutually connected via an internal bus.

2. Description of the Related Art

A conventional type video display terminal such as a television set for home use or for business use and a computer display is closed itself as one system, a slot for expanding a function is not provided as in a personal computer for example and a user cannot expand a necessary function freely. Therefore, if a function of a video display terminal is to be expanded, separate expanded equipment such as a video cassette recorder (VCR), a multiple sub-Nyquist sample encoding (MUSE) decoder and a scan converter (a converter of the synchronizing frequency of an input signal for corresponding to plural input video signals with a synchronizing frequency) is required to be prepared. Therefore, space for installing the expanded equipment is required to be provided newly. This is a common problem not only to a video display terminal but to the other electronic equipment for private use except an information processor such as a personal computer.

Also, the expanded equipment for the above conventional type electronic equipment is provided with an original user interface and is not constituted so that it is linked to the body of the electronic equipment except a part of simple functions. That is, the conventional type normal electronic equipment forms a closed system itself in which a master device (normally a microcomputer and others) which is the master of the system controls other plural slave devices via an internal bus and is not constituted so that the internal bus is extended to an external device. Therefore, in such a system, if the body of electronic equipment and expanded equipment use a slave device provided with the same specification (for example, a device for controlling a user interface device such as various operation keys and an indicator lamp), the same slave device is required to be installed in both equipment and it causes the increase of the cost. In this case, a method in which the body of the electronic equipment and the expanded equipment are connected via a serial channel for example and the expanded equipment uses the slave device via the master device of the body of the electronic equipment is also conceivable, however, in this method, a processing program for communication is newly required and there is a problem that processing becomes complicated as a whole because of communication.

Also, in a relatively small-scale electronic equipment system such as a conventional type video display terminal, a main microcomputer which is a master device controls a user interface and the stable operation of a system in any case and is constituted so that the main microcomputer is always operated as a master device. Therefore, to constitute a system on the premise that a predetermined function is extended later, a user interface program for supporting the extended function is required to be installed in the master device of the body of electronic equipment beforehand. However, for example, if a user uses the body of electronic equipment in which a user interface program which can correspond to an extended function is installed and desires the addition of another extended function later, the user interface program for the body of the electronic equipment is required to be changed to the contents which also supports the added function. Therefore, labor for changing or modifying a user interface program is required and the degree of freedom of the extension of a function is low.

To solve this problem, a method in which a user interface program which can support any presumed extended function is installed in the master device of the body of electronic equipment beforehand and even if any expanded equipment is connected, the above program can correspond to the expanded equipment immediately is conceivable. However, in this method, if presumed extended functions are many, the size of a user interface program for supporting all the extended functions is considerably large and the cost required for read only memory (ROM) for storing the user interface program is also increased. For a user who requires no extended function, the user interface program never used is installed and resources are wasted.

As described above, in the conventional type electronic equipment, as space for installing expanded equipment is required to be newly provided, a problem of arrangement may occur. As electronic equipment itself constitutes a closed system, there is a problem that the same slave device is required in both equipment if the body of electronic equipment and expanded equipment use a slave device provided with the same specification and the cost is increased. Further, when the degree of freedom and facility of the extension of a function are enhanced, a problem that the size of a user interface program and the cost are increased and resources are wasted occurs.

SUMMARY OF THE INVENTION

The object of the present invention is to provide electronic equipment which can enhance the degree of freedom of the extension of a function without requiring space for installation and the increase of the cost.

Electronic equipment according to the present invention is provided with an internal bus for control provided in the body of the equipment, plural control devices mutually connected via the internal bus and path switching means provided on the way of the internal bus for switching an internal path so that the connection of the plural control devices is changed. The above electronic equipment is further provided with connection means for connecting expanded equipment provided with a predetermined extended function, includes a main control device for controlling the whole electronic equipment in the plural control devices in the body of the electronic equipment, when expanded equipment is connected to the connection means, the bus switching means switches the internal bus and a control device installed in the connected expanded equipment can take charge of at least a part of the functions of the main control device in the body of the equipment. In this case, it is suitable that an expanded equipment installed part for installing expanded equipment is provided and connection means for connecting the expanded equipment is provided in the expanded equipment installed part.

In the electronic equipment according to the present invention, the connection of plural control devices mutually connected via the internal bus for control provided in the body of the equipment is changed by switching an internal path by the bus switching means provided on the way of the internal bus, thus producing effect that the degree of freedom is high when the constitution of a system in the body of the equipment is changed.

Also, in the electronic equipment according to the present invention, as the bus switching means switches an internal path when expanded equipment is connected to connection means and a control device installed in the connected expanded equipment takes charge of at least a part of the functions of a main control device in the body of the equipment, the internal bus in the body of the equipment is extended to an external device. Therefore, the control device in the expanded equipment takes charge of at least a part of the functions of the main control device in the body of the equipment by switching a path, the device originally provided in the body of the equipment can be used as it is and it is profitable in view of the reduction of the cost. Further, the electronic equipment according to the present invention can be constituted so that a program corresponding to only basic functions is installed in the body of the equipment, while a program corresponding to the basic functions and an extended function is installed in expanded equipment. That is, a program also corresponding to the extended function is not required to be installed in the body of the equipment and a required and minimum program has only to be installed. Therefore, the size of memory for storing these programs may be small and the increase of the cost is avoided. As described above, according to electronic equipment disclosed in claim 2, a system the degree of freedom of which in relation to the extension of a function is high can be constituted without increasing the cost particularly.

In the electronic equipment according to the present invention, as an expanded equipment installed part for installing expanded equipment is provided and connection means for connecting the expanded equipment is provided in the expanded equipment installed part, space for installing the expanded equipment is not required, space can be saved and there is effect that the expanded equipment can be easily connected.

BRIEF DESCRIPTION OF THE DRAWINGS

FIGS. 5A–5B are block diagrams showing the schematic constitution of the video display terminal in a state in which a scan converter is connected to the body of the video display terminal; and FIG. 6 is a flowchart showing the schematic operation of the scan converter shown in FIG. 5.

DETAILED DESCRIPTION OF THE PREFERRED EMBODIMENTS

Figure 1:
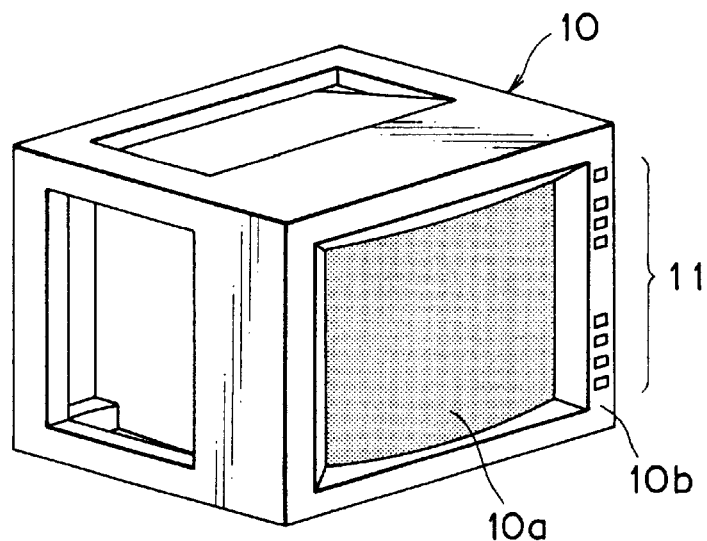
FIG. 1 is a perspective drawing showing the appearance of a video display terminal as an example of electronic equipment equivalent to an embodiment of the present invention.

Referring to the drawings, an embodiment of the present invention will be described in detail below.

Figure 2:
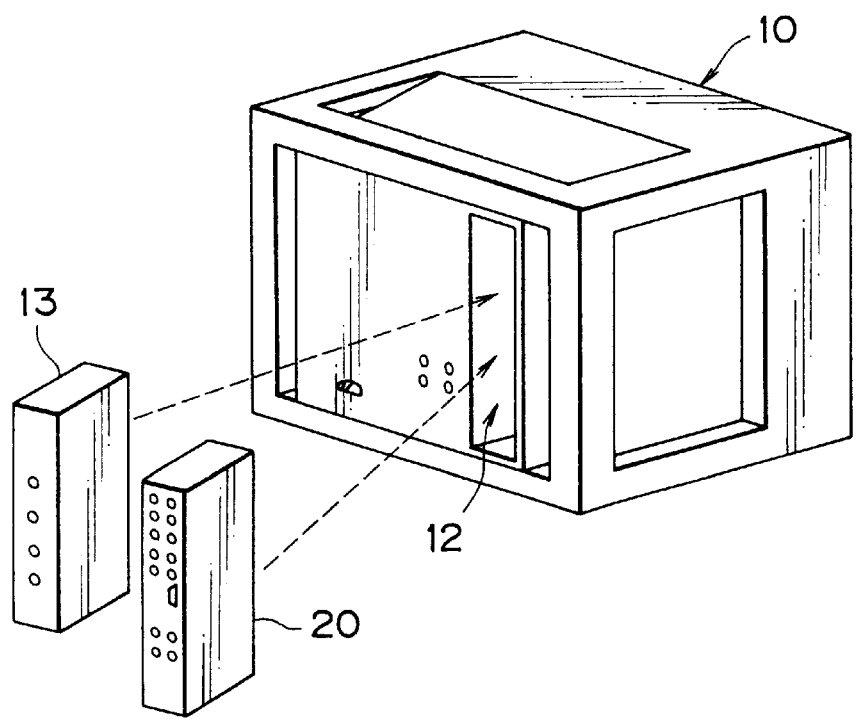
FIG. 2 is a perspective drawing showing another appearance of the video display terminal shown in FIG. 1.

FIGS. 1 and 2 show the appearance of a video display terminal as electronic equipment equivalent to an embodiment of the present invention, FIG. 1 shows the state of the front of the equipment viewed from the diagonal top and FIG. 2 shows the state of the rear of the equipment viewed from the diagonal top. The video display terminal is used for a television set and a computer display for home use or business use for example, however, the video display terminal may be also used for a display for another application.

As shown in FIG. 1, the video display terminal is provided with a display part 10a provided at the front of the body of the video display terminal 10 and some panel operation keys 11 arranged on the front panel 10b. For the panel operation keys 11, a menu key and a selector key used to adjust functions such as contrast and brightness, further, a change-over key for switching the type of an input signal and others are arranged in addition to a power on-off switch and a sound volume adjustment key. In addition, a light receiver not shown for receiving command data sent from a remote controller not shown and others are provided to the front panel.

As shown in FIG. 2, an expanding slot 12 is provided at the rear of the video display terminal and a basic unit 13, an expanded unit 20 and others (a scan converter 20 in this case) can be installed into the expanding slot so that they can be detached. The above basic unit 13 is not provided with a special extended function and provided with RGB input terminals for inputting RGB (red-green-blue) signals from an external device, a serial data port such as RS-232C and others at the rear.

Figure 3:
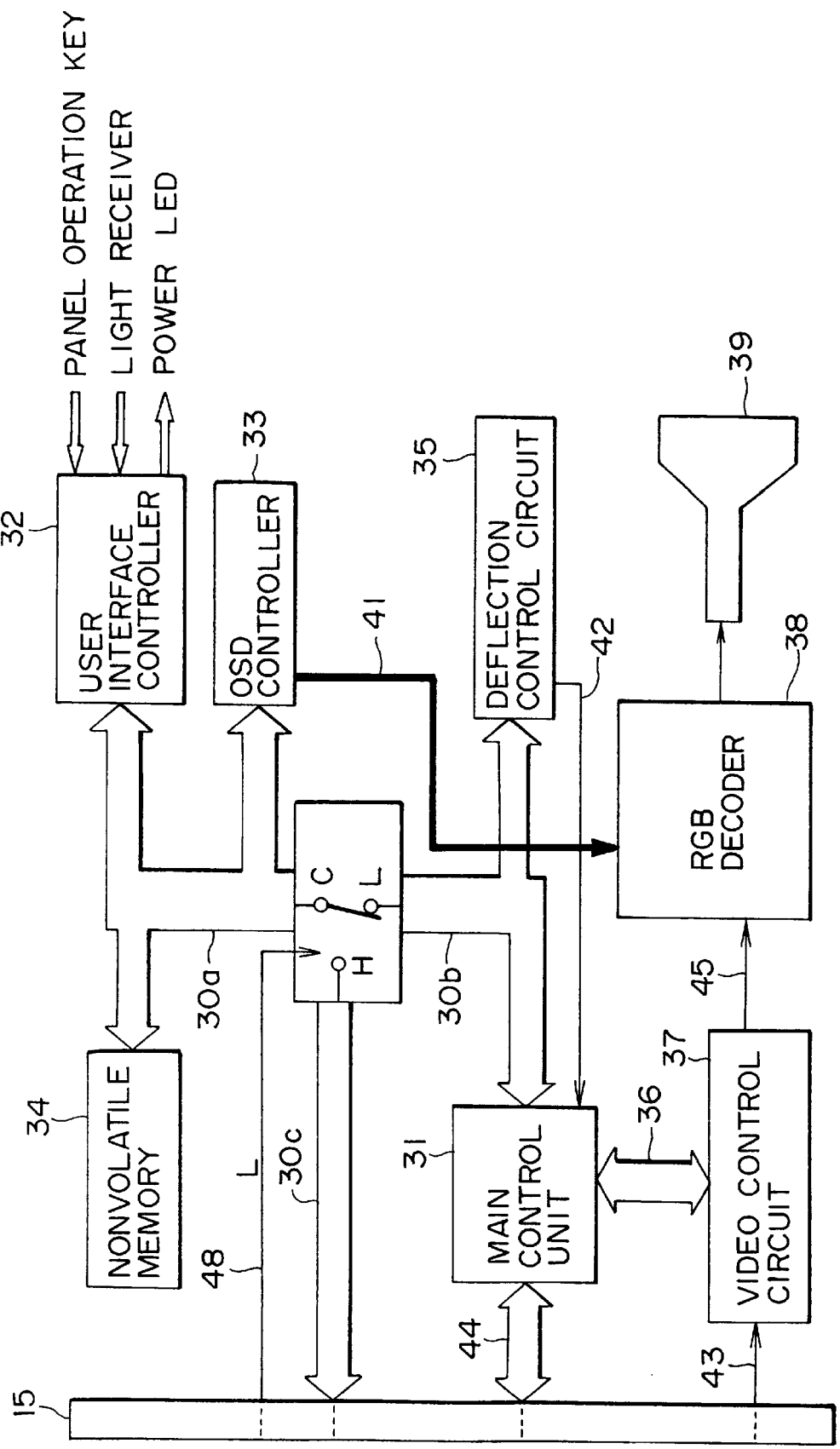
FIG. 3 is a block diagram showing the schematic constitution of the vide display terminal shown in FIG. 1.

FIG. 3 shows the schematic block constitution of the video display terminal 10 shown in FIG. 2. FIG. 3 shows a state in which the scan converter 20 which is an expanded unit is not installed into the expanding slot 12. The video display terminal 10 is provided with CPU, ROM and a random access memory (RAM) respectively not shown, a main control unit 31 constituted by a bus interface circuit and others, a user interface (UI) controller 32 similarly constituted, an on-screen display (OSD) controller 33, a nonvolatile memory 34, a deflection control circuit 35 and a bus switch 47. The user interface controller 32, the OSD controller 33 and the nonvolatile memory 34 of these are connected to the common terminal C of the bus switch 47 via a serial bus 30a and the main control unit 31 and the deflection control circuit 35 are connected to one switched terminal L of the bus switch 47 via a serial bus 30b. A serial bus 30c is connected to the other switched terminal H of the bus switch 47. The bus switch 47 is constituted so that when a signal sent in a control line 48 connected to a connector 15 is at a high or low level, the serial bus 30a is switched to either of the serial bus 30c or the serial bus 30b.

The scan converter 20 shown in FIG. 2 is equivalent to expanded equipment in the present invention and the video display terminal 10 is equivalent to electronic equipment in the present invention. The serial bus 30a, the serial bus 30b and the serial bus 30c are equivalent to an internal bus in the present invention, the user interface controller 32, the OSD controller 33 and the nonvolatile memory 34 are equivalent to a control device in the present invention, the bus switch 47 is equivalent to bus switching means in the present invention, the expanding slot 12 shown in FIG. 2 is equivalent to an expanded equipment installed part in the present invention and the connector 15 is equivalent to connection means in the present invention.

As shown in FIG. 3, as the signal level of the control line 48 is a low level in a state in which the scan converter 20 is not installed and the bus switch 47 is switched to the switched terminal L, the serial bus 30a is connected to the serial bus 30b. In this state, the main control unit 31 controls the user interface controller 32, the OSD controller 33 and the nonvolatile memory 34 as a control device.

The video display terminal 10 is also provided with a video control circuit 37 connected to the main control unit 31 via an inter-integrated circuit bus 36 which is a serial bus, an RGB decoder 38 respectively connected to the output terminal of the video control circuit 37 and the output terminal of the OSD controller 33 and a cathode ray tube (CRT) 39 connected to the output terminal of the RGB decoder 38.

In a state in which the scan converter 20 is not connected to the video display terminal 10, each device in the video display terminal 10 functions as follows:

First, the main control unit 31 controls the operation of the whole video display terminal (only the body of the video display terminal 10 in this case) in this state. That is, the main control unit 31 controls the whole operation in synchronization with a vertical blanking pulse 42 input from the deflection control circuit 35 every timing of a retrace line on the screen. Concretely, the main control unit controls the state of RGB signals 43 input from the RGB input terminal of the connector 15 to the video control circuit 37, controls the lighting of a light emitting diode (LED) not shown for displaying power is on according to command data and others input from the various panel operation keys 11 shown in FIG. 1 via the user interface controller 32 or sent from a remote controller not shown to the light receiver not shown and controls each device connected via the serial bus 30a or 30b. The whole video display terminal 10 can be controlled by inputting control data to the main control unit 31 via a serial data line 44 such as RS-232C from an external device via the connector 15.

The user interface controller 32 samples input data from any of the panel operation keys 11 shown in FIG. 1, the light receiver for a remote controller and others, sends the sampled data to the main control unit 31 via the serial buses 30a and 30b according to inquiry from the main control unit 31 and controls the lighting of LED for displaying power is on according to a request from the main control unit 31.

The nonvolatile memory 34 is composed of electrically erasable and programmable ROM (EEPROM) for example, stores adjusting data in the items of contrast, brightness, horizontal size, vertical size and a horizontal shift and a vertical shift as elements for determining the state of a displayed image and is referred by the main control unit 31 when power is turned on and in others.

The OSD controller 33 outputs video data representing a character superposed on an image on CRT 39 according to an instruction from the main control unit 31 to the RGB decoder 38 as RGB signals 41. For example, if a user adjusts the above functions such as contrast, video data (RGB signals) required for displaying a menu screen as a user interface for adjustment is generated by the OSD controller 33.

The deflection control circuit 35 controls the deflection of horizontal and vertical beams on CRT 39 and some devices in the circuit are controlled by the main control unit 31 via the serial bus 30b. This circuit constitutes a so-called single scan system for controlling deflection at a scanning frequency of the horizontal synchronizing frequency of 31.5 kHz and the vertical synchronizing frequency of 70/60/50 Hz for example.

The video control circuit 37 applies predetermined signal processing to RGB input signals 43 input from the RGB input terminal of the connector 15 according to an instruction sent from the main control unit 31 via the inter-integrated circuit bus 36 and executes the control of inputting them to the RGB decoder 38 as RGB signals 45.

The RGB decoder 38 mixes the RGB signals 45 from the video control circuit 37 and RGB signals 41 from the OSD controller 33 and sends them to CRT 39.

Next, referring to FIG. 4, the operation of the video display terminal 10 constituted as described above will be described.

When power is turned on by operating a power switch of the panel operation keys 11, the main control unit 31 first executes initialization such as the operational check of each device according to a predetermined activating program stored in the main control unit in a step S101. When a vertical blanking pulse 42 is input from the deflection control circuit 35 in Y in a step S102, the main control unit 31 checks whether the bus switch 47 is switched to the switched terminal L or not. As a result, when it is checked in Y in a step S103 that the bus switch is switched to the switched terminal L, the main control unit accesses to all the devices connected to the serial bus 30a and the serial bus 30b, that is, the user interface controller 32, the OSD controller 33, the nonvolatile memory 34 and the deflection control circuit 35 via the bus in a step S104. The main control unit 31 executes necessary processing for a command input from any of the panel operation keys 11 via the user interface controller 32 and a command input from a remote controller not shown in steps S105 and S106 and executes necessary processing for a command according to an RS-232C protocol input from an external device via the serial data line 44 in a step S107. The above necessary processing means controlling the deflection control circuit 35 and the video control circuit 37 concretely to display according to a request from a user.

In the meantime, when it is verified in N in the step S103 that the bus switch 47 is switched to the switched terminal H, the main control unit 31 does not access to the user interface controller 32, the OSD controller 33 and the nonvolatile memory 34 respectively connected to the serial bus 30a via the bus and accesses to only the deflection control circuit 35 connected via the serial bus 30b and the video control circuit 37 connected via the inter-integrated circuit bus 36 in a step S108.

As described above, in a state in which the scan converter 20 is not installed, the main control unit 31 accesses to the user interface controller 32, the OSD controller 33 and the nonvolatile memory 34 as a main control device, executes the control of a user interface, controls the deflection control circuit 35 and the video control circuit 37 and controls via the user interface so that display according to a request is executed. In this embodiment, access via the bus is executed for the period of a vertical retrace line in synchronization with a vertical blanking pulse 42 and the purpose is to prevent a displayed image from being influenced by noise when access via the bus is executed.

Next, the constitution of the scan converter 20 will be described.

FIG. 5 shows schematic block constitution in a state in which the scan converter 20 is installed into the expanding slot 12 of the video display terminal 10 shown in FIG. 2. As shown in FIG. 5, the scan converter 20 is connected to the video display terminal 10 via the connector 15 provided in the expanding slot 12 shown in FIG. 2 so that the scan converter can be detached.

The scan converter 20 is provided with a scan converter controller 51, a frequency converter 52, a nonvolatile memory 53 and an input switching switch 54. These devices are mutually connected via a serial bus 50. The serial bus 50 is constituted so that it is connected to the serial bus 30c of the video display terminal 10 via the connector 15 when the scan converter 20 is connected to the video display terminal 10. The scan converter 20 is also provided with a three-dimensional Y/C separator 56 connected to the scan converter controller 51 via an inter-integrated circuit bus 55 and a hue decoder 57 connected to the output terminal of the three-dimensional Y/C separator 56.

A serial data line 66 and a control line 65 are also connected to the scan converter controller 51. These serial data line 66 and control line 65 are respectively connected to the serial data line 44 and the control line 48 of the video display terminal 10 via the connector 15 when the scan converter 20 is connected to the video display terminal 10. A vertical synchronizing pulse 63 is also input from a frequency converter 52 to the scan converter controller 51.

The three-dimensional Y/C separator 56 and the hue decoder 57 are circuits for converting a composite signal (a video signal reproduced by a normal video cassette recorder (VCR)) input from a composite signal input terminal to RGB signals 61 under control from the scan converter controller 51 connected via the inter-integrated circuit bus 55. More concretely, the three-dimensional Y/C separator 56 separates a luminance signal Y and a chrominance signal C from a composite signal 58 and further, the hue decoder 57 generates RGB signals 61 based upon these luminance signal Y and chrominance signal C. Three-dimensional Y/C separator not only compares video signals every scanning line in a frame but compares video signals between a frame and the next frame and executes predetermined digital processing to separate Y and C.

The input switching switch 54 selects either of RGB input signals 62 input from the RGB input terminal or RGB signals 61 input from the hue decoder 57 according to a switching command sent from the scan converter controller 51 via the serial bus 50 and inputs the selected signals to the frequency converter 52 as RGB signals 60.

The frequency converter 52 converts the RGB signals 60 input via the input switching switch 54 to RGB signals 64 with the horizontal synchronizing frequency of 31.5 kHz and the vertical synchronizing frequency of 60 Hz for example and outputs them. Convertible RGB input signals 60 are signals with the horizontal synchronizing frequency of 15 to 85 kHz and the vertical synchronizing frequency of 45 to 130 Hz for example. Some devices in the frequency converter 52 are controlled by the scan converter controller 51 via the serial bus 50. RGB signals 64 output from the frequency converter 52 are input to the video control circuit 37 of the video display terminal 10 as the RGB signals 43 via the connector 15 when the scan converter 20 is connected to the video display terminal 10.

The nonvolatile memory 53 is composed of EEPROM for example as the nonvolatile memory 34 of the video display terminal 10 and various data (factory adjusted data) adjusted when the scan converter is shipped from a factory and various data (user data) which a user can adjust are written to the nonvolatile memory 53. The factory adjusted data means adjusted data related to a video graphics array (VGA) signal for example and others, only a factory can set the data and a user cannot adjust the data. In the meantime, user data means adjusted data related to contrast, luminance and others and a user can set it freely.

Next, referring to FIG. 6, the operation of the scan converter 20 constituted as described above will be described, relating to the video display terminal 10.

First, when the scan converter 20 is inserted into the expanding slot 12 at the rear of the video display terminal 10, is connected to the video display terminal 10 via the connector 15 and a power switch of the panel operation keys 11 shown in FIG. 2 of the video display terminal 10 is turned on, power is supplied to each part in the video display terminal 10 and is also supplied to each part of the scan converter 20 via the connector 15.

When power is supplied to the scan converter 20, the scan converter controller 51 controls the respective states of a composite signal 58 input to the three-dimensional Y/C separator 56 via the inter-integrated circuit bus 55 and RGB signals 62 input from the RGB signal input terminal and accesses via the bus as follows:

The scan converter controller 51 first executes initialization for checking the operation of each part in the scan converter 20 according to an activating program stored in the scan converter controller in a step S201 shown in FIG. 6 and next, changes the control line 65 to a high level in a step S202. Hereby, the control line 48 of the video display terminal 10 is also changed to a high level and the bus switch 47 is switched to the side (the switched terminal H) on which the serial bus 30a and the serial bus 30c are connected. Hereby, the serial bus 50 of the scan converter 20 is connected to the serial bus 30a via the serial bus 30c of the video display terminal 10 and the scan converter controller 51 obtains control over the user interface controller 32, the OSD controller 33 and the nonvolatile memory 34 of the video display terminal 10.

Figure 4:
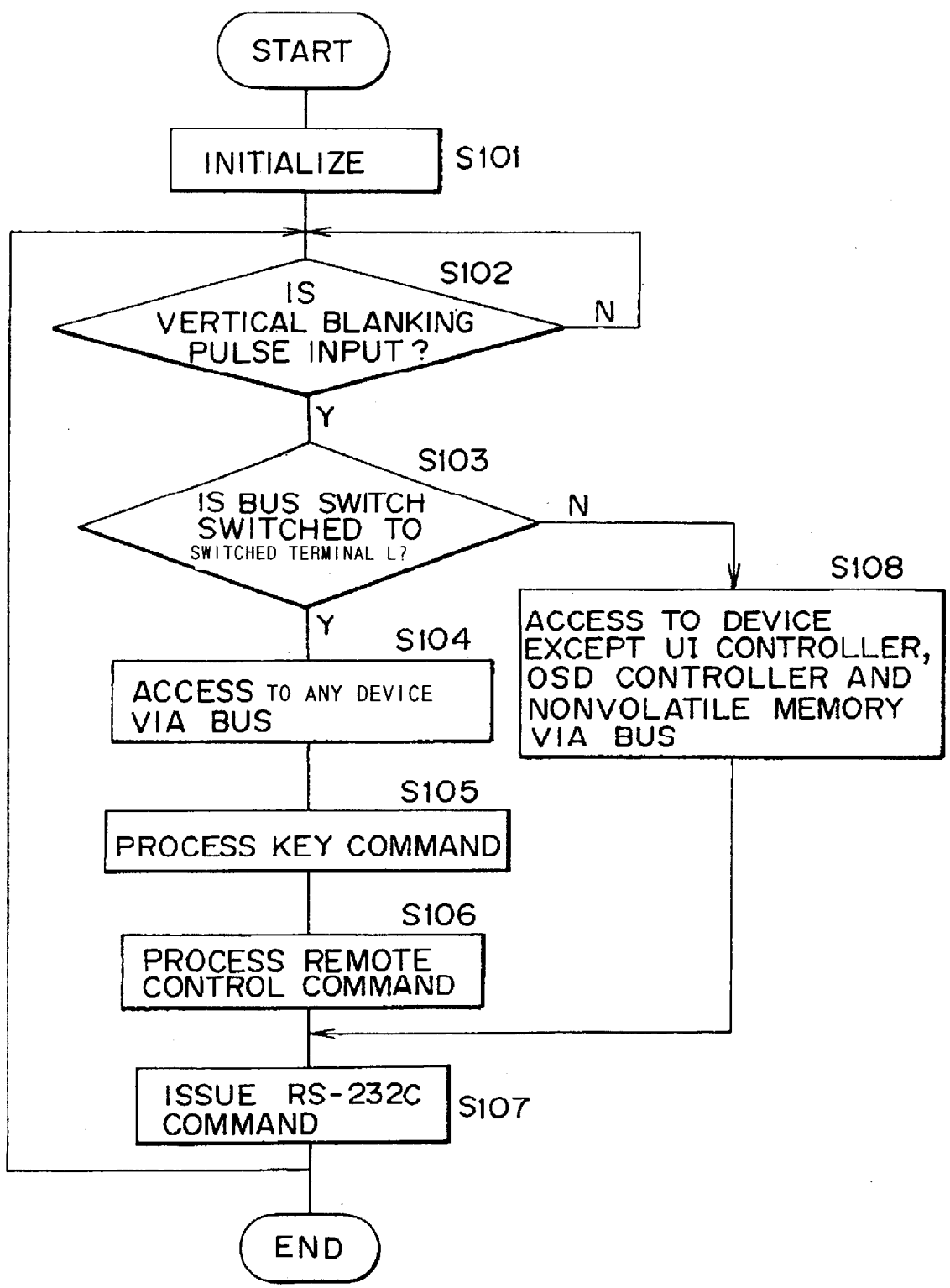
FIG. 4 is a flowchart showing the outline of the operation of the video display terminal shown in FIG. 1.

In the meantime, the main control unit 31 of the video display terminal 10 loses control over the user interface controller 32, the OSD controller 33 and the nonvolatile memory 34 by the switching of the bus switch 47 as described in relation to FIG. 4 and hereafter, does not access to the user interface controller 32, the OSD controller 33 and the nonvolatile memory 34. Hereby, the user interface controller 32, the OSD controller 33 and the nonvolatile memory 34 are completely separated from the main control unit 31 physically and in the logic of software.

Next, the scan converter controller 51 of the scan converter 20 reports that the bus is switched to the main control unit 31 of the video display terminal 10 via the serial data line 66, the connector 15 and the serial data line 44 in a step S203. Afterward, the scan converter controller 51 accesses via the bus in synchronization with a vertical synchronizing pulse 63 input from the frequency converter 52. That is, every time a vertical synchronizing pulse 63 is input in Y in a step S204, the scan converter controller accesses to each device connected to the serial bus 30a via the serial buses 50 and 30c, that is, the user interface controller 32, the OSD controller 33 and the nonvolatile memories 34 and 53 via the bus in a step S205. Concretely, the scan converter controller 51 executes necessary processing in steps S206 and S207 according to a command input from any of the panel operation keys 11 via the user interface controller 32 and a command input from a remote controller not shown and sends a command for controlling display according to the RS-232C protocol to the main control unit 31 of the video display terminal 10 via the serial data lines 66 and 44 in a step S208.

The main control unit 31 of the video display terminal 10 which receives the above command controls the deflection control circuit 35 and the video control circuit 37 and makes the video display terminal display according to a request from a user. Finally, the scan converter controller 51 indirectly also controls the deflection control circuit 35 and the video control circuit 37 via the main control unit 31 and the scan converter controller 51 functions as a main control unit of the whole system.

As described above, in a state in which the scan converter 20 is not connected to the video display terminal 10, the video display terminal is a single scan type of video display terminal the input signal of which is only RGB signals, the horizontal synchronizing frequency of which is 31.5 kHz and the vertical synchronizing frequency of which is 70/60/50 Hz, however, when the scan converter 20 is connected, the function of the video display terminal is extended to a multi-scan type of video display terminal the input signal of which is RGB signals and a composite signal, the horizontal synchronizing frequency of which is 15 to 85 kHz and the vertical synchronizing frequency of which is 45 to 130 Hz.

The relationship between the main control unit 31 of the video display terminal 10 and the scan converter controller 51 of the scan converter 20 will be described further in detail below.

A user interface program (that is, a program for controlling the user interface controller 32) for enabling a user to freely adjust the basic functions of contrast, brightness, horizontal size, vertical size, a horizontal shift, a vertical shift and others via a command from any of the panel operation keys 11 or a remote controller is installed in the main control unit 31, however, a user interface program related to functions after extension is not installed in the main control unit.

In the meantime, a user interface program related to the extended functions of hue (PHASE), chroma (CHROMA), horizontal width (H-WIDTH), vertical height (V-HEIGHT), the horizontal center (H-CENT), the vertical center (V-CENT), a static image (STILL), zoom (ZOOM) and others in addition to the above basic functions is also installed in the scan converter controller 51 of the scan converter 20.

After the scan converter 20 is connected to the video display terminal 10 and functions are extended, the scan converter controller 51 of the scan converter 20 controls a user interface related to all functions, that is, all functions including the basic functions and the extended functions. However, it is the main control unit 31 of the video display terminal 10 that directly executes the contents of these functions. Therefore, if the scan converter controller 51 of the scan converter 20 receives a command of a function from the user interface controller 32 controlled by the scan converter controller, the scan converter controller transfers a command corresponding to the above command to the main control unit 31 of the video display terminal 10 via the serial data lines 66 and 44 and indirectly controls by making the main control unit 31 control the deflection control circuit 35 and the video control circuit 37.

As described above, in the video display terminal equivalent to this embodiment, as the expanding slot 12 for installing expanded equipment such as the scan converter 20 in the video display terminal 10 is provided, space for installing expanded equipment is not required to be newly provided and the space can be saved. In addition, as the scan converter 20 has only to be installed into the expanding slot 12 of the video display terminal 10, work for extending a function is extremely simple.

In the video display terminal equivalent to this embodiment, in a state in which the scan converter 20 is connected to the video display terminal 10, as the serial bus 30c which is the internal bus of the video display terminal 10 and the serial bus 50 which is the internal bus of the scan converter 20 are connected, the internal bus of the video display terminal 10 seems to be extended to an external device. Therefore, the scan converter controller 51 which is a main control device by the switching of the bus can control the user interface by using the user interface controller 32 provided to the video display terminal 10 as it is. Therefore, a user interface controller is not required to be provided separately on the side of the scan converter 20 and in this point, the cost can be also reduced. In addition, in this case, as the scan converter controller 51 does not utilize the user interface controller 32 via the main control unit 31 of the video display terminal 10 but directly accesses to the user interface controller 32 using the internal bus, processing is simplified more, compared with a case that the user interface is indirectly controlled via communication between the scan converter controller 51 and the main control unit 31.

Further, in the video display terminal equivalent to this embodiment, as the serial buses 30a, 30b and 30c which are the internal bus of the video display terminal 10 can be switched in the bus switch 47 and the scan converter controller 51 of the scan converter 20 controls the user interface in place of the main control unit 31 of the video display terminal 10 after the scan converter 20 which is expanded equipment is connected to the video display terminal 10, a user interface program for supporting only basic functions has only to be installed in the main control unit 31 of the video display terminal 10, while a user interface program for supporting only basic functions and extended functions related to the scan converter has only to be installed in the scan converter controller 51 of the scan converter 20. That is, as a user interface program for also supporting extended functions is not required to be installed in the video display terminal 10 and a required and minimum user interface program has only to be installed, ROM with large capacity is not required. Therefore, a system with the high degree of freedom in relation to the extension of a function can be constituted without increasing the cost. For a user who does not use expanded equipment, a hardware resource of ROM is not wasted.

Referring to the embodiments, the present invention is described above, however, the present invention is not limited to these embodiments and variations are allowed. For example, in the above embodiments, in a state in which the scan converter 20 is connected to the video display terminal 10, the scan converter controller 51 of the scan converter 20 controls the user interface which is a part of the functions of the main control unit 31 of the video display terminal 10, instructs the main control unit 31 of the video display terminal 10 as a slave device to control over actual display as a master device and controls the whole system, however, conversely, the scan converter controller 51 of the scan converter 20 only controls the user interface and the main control unit 31 of the video display terminal 10 may also control the whole system. In this case, the main control unit 31 of the video display terminal 10 may be constituted so that the main control unit polls the scan converter controller 51 of the scan converter 20 and obtains command data related to the user interface from the scan converter controller 51.

In the above embodiments, the scan converter 20 is housed and installed in the expanding slot 12 of the video display terminal 10 and both are connected via the connector 15, however, the present invention is not limited to the embodiments, the video display terminal 10 and the scan converter 20 as an external device may be also connected via a dedicated cable. However, in this case, it is desirable that the cable is set to the length as short as possible in consideration of the effect of noise caused on the cable and the cable is electromagnetically shielded.

In the above embodiments, the scan converter for a video display terminal is described as an example of expanded equipment, however, the present invention can be similarly applied to expanded equipment provided with another function such as VCR and MUSE decoder. In this embodiment, a video display terminal is described as an example of electronic equipment, however, the present invention is not limited to this embodiment and can be widely applied to all types of electronic equipment provided with expanded equipment.

What is claimed is:

1. An electronic equipment, comprising:

an internal bus for control provided in a body of said electronic equipment;

a plurality of control devices mutually connected via said internal bus wherein at least one of said plurality of control devices is an external, expanded equipment; and bus switching means provided on said internal bus for switching said internal bus to a state in which said plurality of control devices are connected is changed to add said external device to said internal bus.

2. An electronic equipment according to claim 1, wherein at least one of said plurality of control devices is a main control device for controlling the body of said electronic equipment.

3. An electronic equipment according to claim 1, further comprising:

connection means for connecting said expanded equipment and said expanded equipment is provided with a predetermined extended function.

4. An electronic equipment according to claim 3, wherein:

said expanded equipment is detachably connected to the body of said equipment via said connection means.

5. An electronic equipment according to claim 3, wherein at least one of said plurality of control devices is a main control device for controlling the body of said electronic equipment, and said bus switching means switches said internal bus so that a control device mounted on said expanded equipment takes charge of at least a part of the function of said main control device when said expanded equipment is connected to said connection means.

6. An electronic equipment according to claim 3, wherein the body of said electronic equipment comprises an expanded equipment receiving part for receiving said expanded equipment; and said connection means is provided in said receiving part.

7. An electronic equipment according to claim 1, further comprising:

control means; and an external expanded equipment, wherein said external expanded equipment is provided with a predetermined extended function.

* * * * *

UNITED STATES PATENT AND TRADEMARK OFFICE
CERTIFICATE OF CORRECTION

PATENT NO. : 6,161,156

DATED : December 12, 2000

INVENTOR(s) : Suzuki et al.

It is certified that error appears in the above-identified patent and that said Letters Patent is hereby corrected as shown below:

<u>ON THE TITLE PAGE</u>
After "[22] Filed: Mar. 27, 1998", Insert the following:

Item [30]     Foreign Application Priority Data

Mar. 31, 1997 [JP]    Japan  .............  9-080881

Signed and Sealed this

Twenty-ninth Day of May, 2001

*Attest:*

NICHOLAS P. GODICI

*Attesting Officer*     *Acting Director of the United States Patent and Trademark Office*